United States Patent [19]

Takeuchi et al.

[11] Patent Number: 4,539,603
[45] Date of Patent: Sep. 3, 1985

[54] VIDEO SIGNAL REPRODUCING DEVICE

[75] Inventors: Hajime Takeuchi, Kanagawa; Yoshikazu Okuyama, Saitama, both of Japan

[73] Assignee: Sony Corporation, Tokyo, Japan

[21] Appl. No.: 480,578

[22] Filed: Mar. 30, 1983

[30] Foreign Application Priority Data

Apr. 2, 1982 [JP] Japan ................................. 57-54931

[51] Int. Cl.³ ............................................. H04N 5/782
[52] U.S. Cl. .................................. 360/10.1; 360/14.1; 360/77; 360/69
[58] Field of Search .................... 360/10.1, 10.2, 10.3, 360/14.1, 69, 71, 72.1, 72.2, DIG. 1, 77; 358/338; 369/53

[56] References Cited

U.S. PATENT DOCUMENTS 4,318,140 3/1982 Shigeta ................................ 360/10.3

OTHER PUBLICATIONS

Vol. 88, Dec. 1979, SMPTE Journal, pp. 831-833.

Primary Examiner—Robert L. Richardson
Attorney, Agent, or Firm—Lewis H. Eslinger; Alvin Sinderbrand

[57] ABSTRACT

A video signal reproducing device includes a magnetic head for reproducing the video signal recorded in slant tracks on a magnetic tape, a transport mechanism for driving the tape at a controllably varied speed, and a tracking control circuit for supplying tracking control signals to the magnetic head whereby the head tracks the recorded video signal. The device further includes a system control circuit for controlling the transport mechanism to drive the tape at a selected playback speed, and a display connected to the system control circuit for indicating a relationship between the predetermined duration and a duration of the reproduced video signal as played back with the tape driven at the selected playback speed.

14 Claims, 3 Drawing Figures

VIDEO SIGNAL REPRODUCING DEVICE

BACKGROUND OF THE INVENTION

1. Field of the Invention

This invention relates to information signal reproducing apparatuses, and more particularly, to a video signal reproducing apparatus in which a desired playback speed is displayed.

2. Description of the Prior Art

When a video signal is recorded on a magnetic tape, instances arise in which it is desirable to replay the tape at a slower or faster than normal speed. For example, when a television program of a predetermined duration is interrupted by a special news broadcast, the remaining portion of the television program must be replayed at a faster than normal speed so that the program will terminate at the prescribed time.

Prior art video tape reproducing devices include control elements which permit the video tape to be reproduced, or played back, at a speed faster or slower than the normal reproducing speed (i.e., the speed at which the video signal was recorded). The control elements generally show the ratio of the playback speed to the record speed over a wide range, for example, from −1 (reverse normal speed) to +3 (three times normal speed).

A significant drawback with prior art video tape reproducing apparatuses is the difficulty of adjusting the playback speed with the control element when the playback speed varies only slightly from the recording speed. Another drawback is that the prior art devices do not clearly display the amount of increase or decrease of the selected playback speed.

OBJECTS AND SUMMARY OF THE INVENTION

It is therefore an object of the present invention to provide a video signal reproducing apparatus which avoids the aforedescribed drawbacks of the prior art.

It is another object of the present invention to provide a video signal reproducing apparatus which shows the ratio of the recording time of the tape to the desired playback time.

It is yet another object of the present invention to provide a video signal reproducing apparatus with a display which indicates, over a relatively narrow range, the percent change in the playback speed as compared to the record speed.

In accordance with the present invention, a video signal reproducing device of the type including a magnetic head for reproducing the video signal recorded in slant tracks on a magnetic tape, transport means for driving the tape at a controllably varied speed, tracking control means for supplying tracking control signals to the magnetic head whereby the magnetic head tracks the video signal, comprises system control means for controlling the transport means to drive the tape at a selected playback speed, and display means connected with the system control means for indicating a relationship between the predetermined duration and a duration of the reproduced video signal as played back with the tape driven at the selected playback speed.

The above, and other objects, features, and advantages of the present invention will be apparent from the following detailed description of an illustrative embodiment thereof which is to be read in connection with the accompanying drawings.

DETAILED DESCRIPTION OF THE PREFERRED EMBODIMENTS

Figure 1:
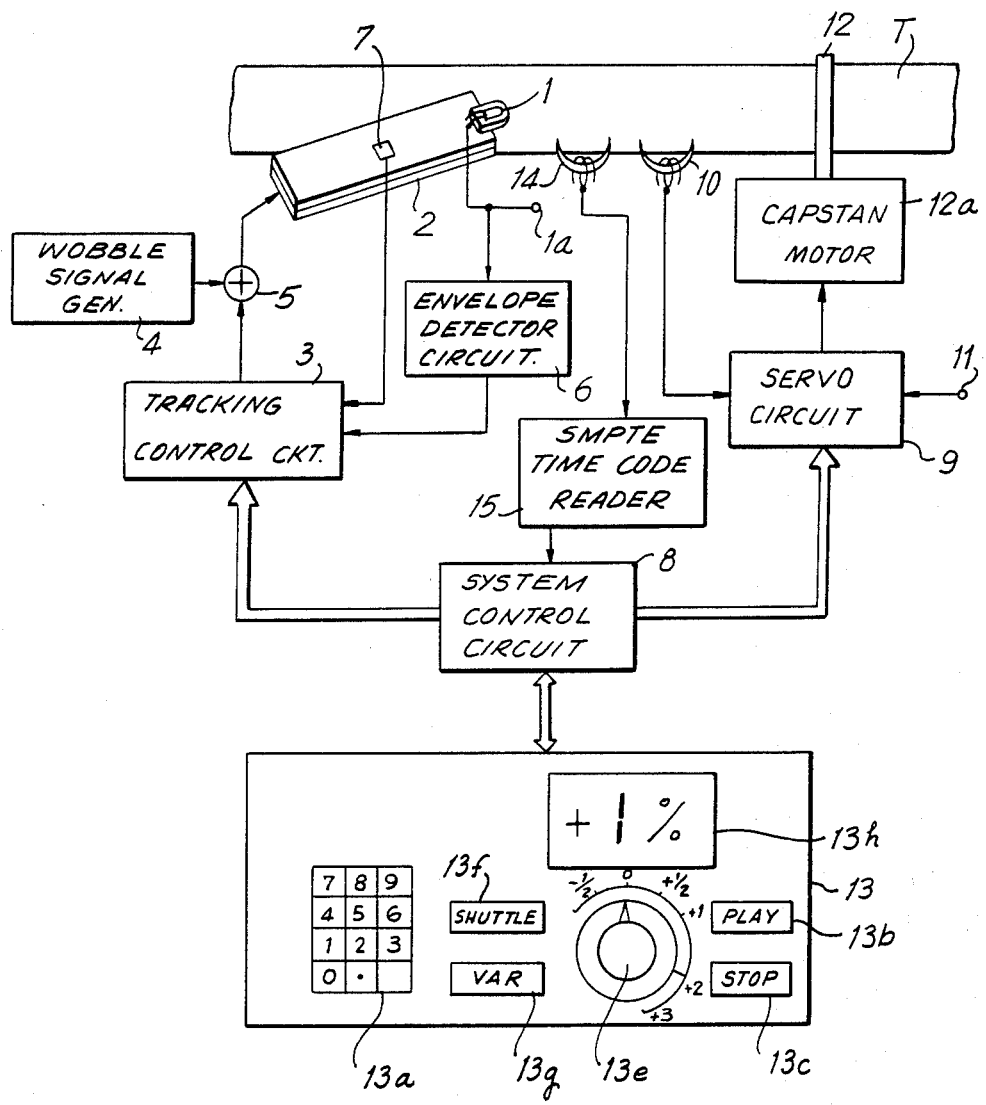
FIG. 1 is a block diagram of an embodiment of a video signal reproducing apparatus in accordance with the present invention.

Referring to the drawings, and initially to FIG. 1 thereof, a video signal reproducing apparatus in accord with the present invention includes a rotary magnetic head 1 mounted on a rotary drum for reproducing video signals recorded in slanted or helical tracks on a magnetic tape T. Rotary magnetic head 1 is attached to a tracking position adjusting member 2 which can be an electro-mechanical transducer such as a bimorph plate. The reproduced video signal from rotary magnetic head 1 is supplied to an output terminal 1a for subsequent processing. A tracking control circuit 3 generates a control signal having a DC voltage component which is supplied, together with a wobbling or dither signal from a wobble signal generator 4, to an adder circuit 5. The output signal from adder circuit 5 is supplied to tracking position adjusting member 2, i.e., a control voltage is supplied across the electrodes attached to both surfaces of the bimorph plate to rotary magnetic head 1 diametrically to trace or scan a desired record track. It is to be appreciated that even if the transport speed of video tape T is different from the transport speed for recording (i.e., normal speed), rotary magnetic head 1 will be shifted or displaced by a predetermined distance in a direction across its scanning direction so that accurate tracking of the desired record track is performed.

The reproduced video signal from rotary magnetic head 1 is also supplied to an envelope detector circuit 6 which supplies an output signal in response thereto to tracking control circuit 3. Tracking control circuit 3 controls the relative position of rotary magnetic head 1 so that the output signal from envelope detector circuit 6 reaches its maximum level to effect accurate tracking.

A strain gauge 7 is bonded or mounted on the surface of tracking position adjusting member 2. Strain gauge 7 detects the displacement of tracking position adjusting member 2 and supplies a corresponding signal to tracking control circuit 3 as a reference level signal. Tracking control circuit 3 then generates its control signal using the detected signal from strain gauge 7 as the reference signal.

Control of magnetic head 1 can be performed in accordance with the disclosure of the Sakamoto U.S. Pat. No. 4,296,443, assigned to the assignee of the present invention.

A system controller 8 generates command signals to control the movements of magnetic tape T. In a preferred embodiment, system controller 8 includes a microprocessor for generating the required command signals. When the illustrated embodiment of a video signal reproducing apparatus is operated in a mode in which frames are dropped at predetermined intervals, system controller 8 supplies command signals to tracking control circuit 3 so that tracking control circuit 3 supplies the required control signal to tracking position adjusting member 2. A servo circuit 9 controls the rotation of a capstan motor 12 associated with a capstan 12 whereby magnetic tape T moves at a predetermined speed. Servo circuit 9 receives as its input signals the command signals from system controller 8, a controlled signal reproduced from a control signal playback head 10, and a reference signal supplied from a reference input terminal 11.

A time code playback head 14 detects the SMPTE time code recorded on magnetic tape T and supplies the reproduced signal to an SMPTE time code reader 15. SMPTE time code reader 15 reads an address signal reproduced by playback head 14 and supplies a corresponding output signal to system controller 8. The output signal from SMPTE time code reader 15 is used to determine an "in" point address in a playback operation, as will be described more fully hereinbelow.

A control panel 13 is connected to system controller 8 through a bus line. Control panel 13 includes a keyboard 13a, a play control element 13b, a stop control element 13c, a search dial 13e, a shuttle control element 13f, a variable speed control element 13g and a visual display 13h. Keyboard 13a can be used to select the playback speed of tape T. In the preferred embodiment, however, search dial 13e is used to select the speed at which magnetic tape T will be reproduced. In the illustrated embodiment, search dial 13e increases the speed at which tape T is reproduced when it is rotated in the clockwise direction, and decreases the speed at which tape T is reproduced when rotated in the counterclockwise direction. As more fully described hereinbelow, search dial 13e is calibrated in one range from a −1 reproducing speed (reverse normal speed) to a +3 reproducing speed (three times normal speed). In a second range, selected in response to the actuation of variable speed control element 13g, search dial 13e selects a tape speed within a relatively narrow range, e.g., ±20% of the normal reproducing speed. In one embodiment, search dial 13e varied the reproducing speed in the narrow range in increments of 0.1%.

Display 13h indicates, in the illustrated embodiment, the ratio of the playback speed to the record speed as a percent. In an alternate embodiment, display 13h can display the ratio between the predetermined program duration and the selected playback duration of the program. For example, if the predetermined duration of the television program is 72 minutes, and the selected playback duration is 60 minutes, display 13h can display 72/60 or 1.2.

Figure 2:
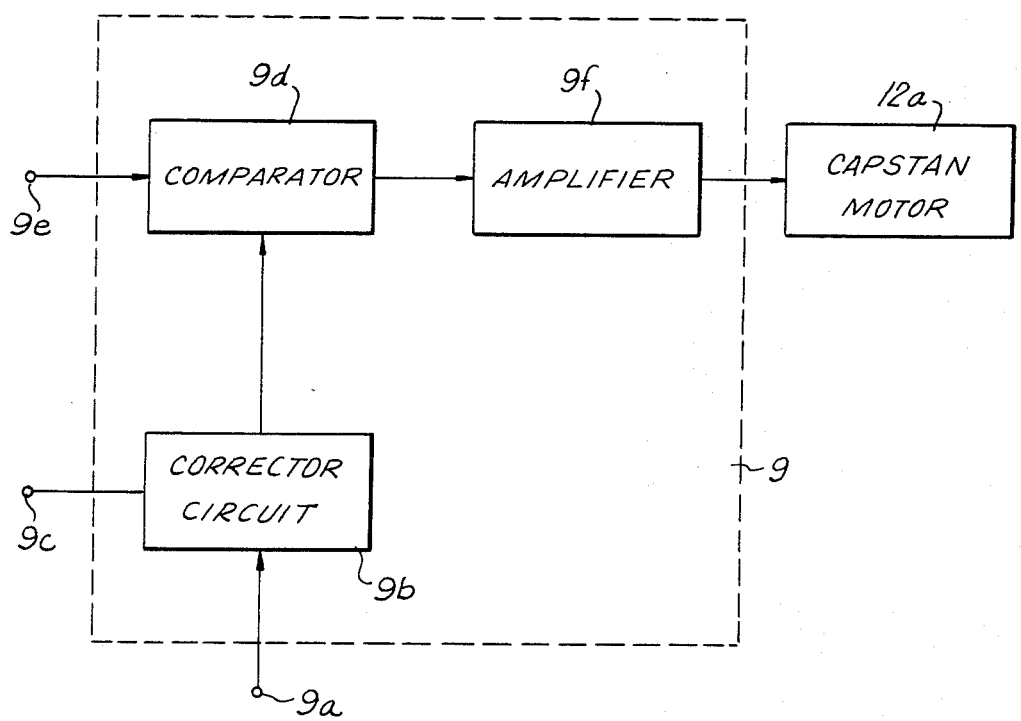
FIG. 2 is a block diagram of a servo circuit included in the embodiment of FIG. 1.

FIG. 2 illustrates an exemplary construct of servo circuit 9 of FIG. 1. The program play speed signal from system controller 8 in the form of, for example, a pulse signal, is supplied through an input terminal 9a to a corrector circuit 9b. A reference signal from a reference signal input terminal 9c is also supplied to corrector circuit 9b. Corrector circuit 9b supplies a corrected reference signal to a comparator 9d in response to the program play speed signal and the reference signal. A control signal from an input terminal 9e is supplied to comparator 9d and is generated in response to the movements of magnetic tape T. Comparator 9d supplies a control signal in response to the comparisons performed thereby to capstan motor 12a through an amplifier 9f.

The movements of magnetic tape T in response to actuation of the control elements of control panel 13 are next to be described. In a first mode of operation, in which search dial 13e selects a predetermined reproducing speed for magnetic tape T in the relatively large range, rotation of search dial 13e selects the predetermined reproducing speed when shuttle control element 13f is actuated. In the first mode, search dial 13e operates in a conventional fashion.

In a second mode, designated as the program play mode, display 13h displays in percent the change in the tape speed relative to the normal reproducing speed. The amount of change is proportional to the rotational position of search dial 13e. For example, when it is desired to increase the speed of playback by 2%, the variable speed control element 13g is actuated and search dial 13e is rotated until display 13h displays the selected 2% figure. Once the increase or decrease in playback speed is selected with the use of variable speed control element 13g and search dial 13e, variable speed control element 13g is actuated in conjunction with play control element 13b to reproduce magnetic tape T in accord with the selected speed, referred to herein as the program play speed.

Once variable speed control element 13g is released, search dial 13e is locked into the program play speed and such speed cannot be altered so long as the illustrated embodiment is operated in the program play mode.

If it is desired to alter the playback speed again, variable speed control element 13g can be actuated along with search dial 13e.

When it is desired to terminate the program play mode, the play control element 13b, shuttle control element 13f, or stop control element 13c can be actuated. In the preferred embodiment, when play control element 13b is actuated, the device changes into the first mode and continues in a conventional play mode reproduction. When shuttle control element 13f is actuated, the device changes into a still mode reproduction. When the program play mode is terminated by actuation of stop control element 13c, the device changes into a stop mode.

Whenever the illustrated embodiment is operated in the program play mode, system controller 8 supplies control signals to servo circuit 9 and tracking control circuit 3. Capstan 12 and tracking position adjusting member 2 are controlled to permit playback operation to occur at the selected program play speed.

It is to be appreciated that the start of the program play mode requires simultaneous actuation of both variable speed control element 13g and play control element 13b.

In the illustrated embodiment, the SMPTE time code is read by time code playback head 14 and SMPTE time code reader 15. When the SMPTE time code is recorded on the tape, a program defined by an "in" point address and an "out" point address can be played back in the program play mode during normal playback operation. In such a procedure, a conventional playback operation is performed until a previously selected "in" point address is reached. At such point, the device is operated in the program play mode until a previously selected "out" point address is reached. At that time, the device returns to the conventional play mode.

In still a further embodiment of the present invention, the program play speed can be changed by inputting the duration of the tape program and the desired playback time. Such data can be supplied to a microcomputer included in the embodiment of the present invention through keyboard 13a.

In yet another embodiment of the present invention, the program play mode can be initiated by inputting the end address of the broadcast program and the end time of the broadcast program. This embodiment of the invention automatically determines the playback speed from reading the current SMPTE time code and the projected SMPTE time code at the end of the broadcast program.

It is to be appreciated that an advantage of the present invention resides in the prevention of an erroneously selected playback speed while the device is operating in the program play mode. This advantage follows from the fact that variable speed control element 13g must be actuated before search dial 13e can select the playback speed.

Figure 3:
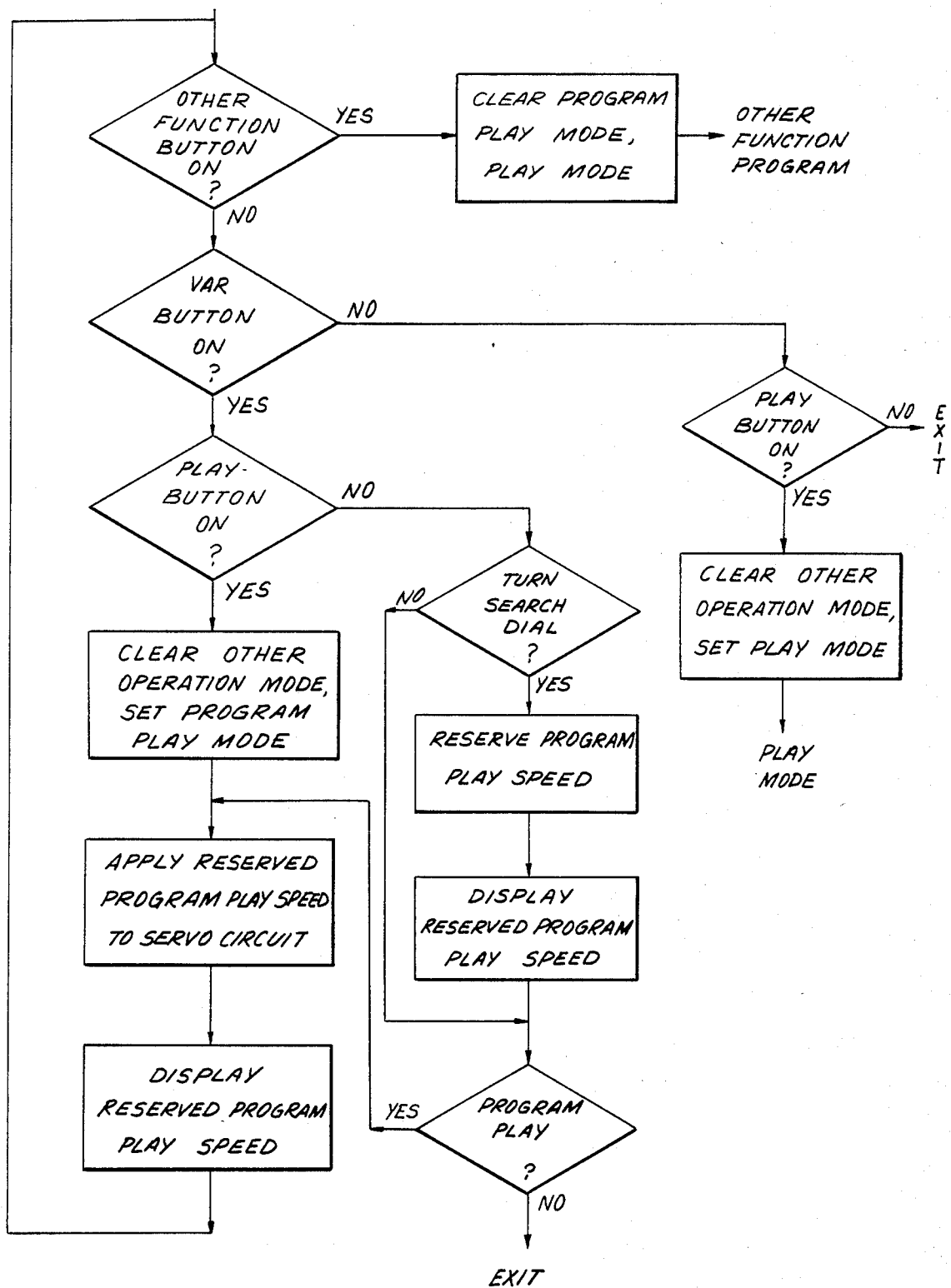
FIG. 3 is a flow chart for a program used with a microprocessor included in a system controller of the embodiment of FIG. 1.

FIG. 3 illustrates a flow chart of a program which can be used in accord with the microprocessor included in the illustrated embodiment of the invention. The program in accord with FIG. 3 can be used to perform the above-described operations with respect to magnetic tape T. As will be recognized by a person of ordinary skill in the art, a suitable program can be prepared from the flow chart of FIG. 3 for any given microprocessor.

Although specific embodiments of the present invention have been described in detail herein with reference to the accompanying drawings, it is to be understood that the invention is not limited to those precise embodiments, and that various changes and modifications may be effected therein by one skilled in the art without departing from the spirit and scope of the invention as defined in the appended claims.

What is claimed is:

1. In a video signal reproducing device of the type including a magnetic head for reproducing said video signal recorded in slant tracks on a magnetic tape, said video signal including a program signal of a predetermined time duration when said tape is driven at a predetermined speed, transport means for driving said tape at a controllably varied speed, and tracking control means for supplying tracking control signals to said magnetic head whereby said head tracks said video signal, said device comprising system control means for controlling said transport means to drive said tape at a selected playback speed; and display means connected with said system control means for indicating the ratio of said predetermined time duration and a duration of the program signal as played back with said tape driven at said selected playback speed 2. The device of claim 1; wherein said ratio is the fractional relation of said predetermined time duration and said selected playback duration.

3. The device of claim 1; wherein said ratio is the precent relation of said selected playback speed of said tape to the recording speed.

4. The device of claim 1; and further comprising speed control means for determining said selected playback speed of said tape.

5. The device of claim 4; wherein said system control means includes keyboard means for determining said selected playback speed of said tape.

6. The device of claim 4; wherein said system control means operates said device in a first mode in which said speed control means selects said playback speed of said tape within a relatively small range and in a second mode in which said speed control means selects said playback speed of said tape within a relatively large range, and wherein said system control means includes mode selector means for selecting one of said first and second modes.

7. The device of claim 6; wherein said small range is from about twenty percent slower than said recording speed to about twenty percent faster than said recording speed, and said large range is from about reverse said recording speed to about three times said recording speed.

8. The device of claim 6; wherein said system control means includes transport control means for changing, upon actuation, said device from said first mode to said second mode and for actuating said speed control means to thereby determine said speed of said tape when said device operates in said second mode.

9. The device of claim 4; wherein said system control means comprises a system controller connected to said transport means and control means for supplying control signals to said system controller to effect selected tape speeds.

10. The device of claim 9; and further comprising:
deflecting means for mounting said transducer means;
wobble signal generating means for generating wobble signals;
tracking control means for generating tracking control signals; and
adding means for receiving said wobble signal and said tracking control signals and for supplying the sum of said signals to said deflecting means.

11. The device of claim 10; wherein said transport means includes:
motor means for driving said magnetic tape; and
servo means connected to said system control means for supplying speed control signals to said motor means.

12. The device of claim 11, in which control signals are recorded on said magnetic tape; and further comprising playback head means connected to said servo means for reading said control signals recorded on said magnetic tape.

13. The device of claim 12; wherein said servo means comprises:
corrector means for receiving said control signals from connected said system control means and generating corrected reference speed signals in response thereto; and
comparator means for comparing said corrected reference speed signals from said corrector means with said control signals read by said playback head means and generating compared speed signals in response thereto.

14. The device of claim 10, in which positional signals are recorded on said magnetic tape; and further comprising reading means connected to said system control means for reading said positional signals recorded on said magnetic tape.

* * * * *